United States Patent
Stamenkovic et al.

(10) Patent No.: US 11,353,227 B2
(45) Date of Patent: Jun. 7, 2022

(54) METHOD AND DEVICE FOR REDUCING OR ELIMINATING THE TEMPERATURE DROP OF THE SUPPLY AIR TEMPERATURE DURING DEFROSTING OF AN EVAPORATOR AT AN AIR HANDLING UNIT

(71) Applicant: FLÄKTGROUP SWEDEN AB, Jönköping (SE)

(72) Inventors: Dusan Stamenkovic, Jönköping (SE); Urban Kronström, Tranås (SE)

(73) Assignee: FLÄKTGROUP SWEDEN AB, Jönköping (SE)

( * ) Notice: Subject to any disclaimer, the term of this patent is extended or adjusted under 35 U.S.C. 154(b) by 360 days.

(21) Appl. No.: 16/309,550

(22) PCT Filed: May 18, 2017

(86) PCT No.: PCT/SE2017/050522
§ 371 (c)(1),
(2) Date: Dec. 13, 2018

(87) PCT Pub. No.: WO2017/217904
PCT Pub. Date: Dec. 21, 2017

(65) Prior Publication Data
US 2019/0178515 A1    Jun. 13, 2019

(30) Foreign Application Priority Data

Jun. 16, 2016 (SE) .................................... 1650851-7

(51) Int. Cl.
*F24F 11/41* (2018.01)
*F24F 12/00* (2006.01)
(Continued)

(52) U.S. Cl.
CPC ............ *F24F 11/41* (2018.01); *F24F 12/003* (2013.01); *F25B 47/025* (2013.01); *F24F 5/0017* (2013.01); *Y02B 30/52* (2013.01); *Y02B 30/56* (2013.01)

(58) Field of Classification Search
CPC ........ F24F 11/41; F24F 12/003; F24F 5/0017; F24F 5/0021; F24F 2005/0025;
(Continued)

(56) References Cited

U.S. PATENT DOCUMENTS 2,286,605 A * 6/1942 Crawford .............. F24F 3/0525
                                                                62/170
2,919,558 A * 1/1960 Lauer ...................... F24F 3/001
                                                                62/160
(Continued)

FOREIGN PATENT DOCUMENTS

| EP | 2239522 A2 * | 10/2010 | ............ F24F 12/006 |
| WO | WO-2013144441 A1 * | 10/2013 | ............... F24D 5/02 |
| WO | WO-2018199835 A1 * | 11/2018 | ............ F24F 12/001 |

*Primary Examiner* — Miguel A Diaz
(74) *Attorney, Agent, or Firm* — FisherBroyles, LLP

(57) ABSTRACT

Method and device for reducing or eliminating a temperature drop of the supply air temperature during defrost operation, at an air handling unit (1) which is arranged with a heat pump (2) for recovering heat from an extract air stream (3) and transfer to a supply air stream (4). During defrosting of a first DX-coil (5), arranged in the extract air stream (3), by reversible operation of the heat pump (2), accumulated heat energy (E) is used for reduction or elimination of the temperature drop in the supply air temperature during the defrost operation, and which energy has been stored in an accumulator medium (7) which is at least partially in contact with the supply air flow (4). The stored energy (E) is delivered by heat exchange with the supply air stream (4) in a position after a second DX-coil (6) through a heating coil (8) arranged in the supply air stream (4).

14 Claims, 1 Drawing Sheet

(51) Int. Cl.
*F25B 47/02* (2006.01)
*F24F 5/00* (2006.01)

(58) Field of Classification Search
CPC ...... F24F 3/0525; F25B 47/025; Y02B 30/52; Y02B 30/56
See application file for complete search history.

(56) References Cited

U.S. PATENT DOCUMENTS

| | | | | |
|---|---|---|---|---|
| 3,402,564 A * | 9/1968 | Nussbaum | ............ | F24F 3/0525 62/173 |
| 4,142,574 A * | 3/1979 | Shavit | ............ | F24F 11/08 165/208 |
| 4,149,389 A * | 4/1979 | Hayes | ............ | F25B 7/00 62/114 |
| 4,165,037 A * | 8/1979 | McCarson | ............ | F24F 3/001 237/1 R |
| 4,391,104 A * | 7/1983 | Wendschlag | ............ | F25B 30/02 62/79 |
| 4,502,292 A * | 3/1985 | Ares | ............ | F24F 3/001 237/2 B |
| 4,513,574 A * | 4/1985 | Humphreys | ............ | F24F 3/0525 236/49.1 |
| 6,170,271 B1 * | 1/2001 | Sullivan | ............ | F24F 3/153 62/176.1 |
| 6,324,860 B1 * | 12/2001 | Maeda | ............ | F24F 3/1423 62/271 |
| 6,442,951 B1 * | 9/2002 | Maeda | ............ | F24F 3/1423 62/271 |
| 10,539,333 B2 * | 1/2020 | Andersson | ............ | F24D 12/02 |
| 10,782,045 B2 * | 9/2020 | LePoudre | ............ | F24F 5/0035 |
| 2006/0201183 A1 * | 9/2006 | Otake | ............ | F24F 3/1423 62/271 |
| 2008/0108295 A1 * | 5/2008 | Fischer | ............ | F24F 3/1423 454/239 |
| 2009/0293507 A1 * | 12/2009 | Narayanamurthy | .. | F24F 5/0017 62/59 |
| 2011/0308265 A1 * | 12/2011 | Phannavong | ............ | F24F 12/001 62/160 |
| 2012/0312042 A1 * | 12/2012 | Jeong | ............ | F25B 30/02 62/207 |
| 2012/0312045 A1 * | 12/2012 | Kim | ............ | F25B 7/00 62/238.6 |
| 2013/0056177 A1 * | 3/2013 | Coutu | ............ | F28D 19/042 165/96 |
| 2013/0306301 A1 * | 11/2013 | Tamaki | ............ | F24D 17/001 165/287 |
| 2014/0260358 A1 * | 9/2014 | Leete | ............ | F24D 19/1054 62/79 |
| 2015/0292786 A1 * | 10/2015 | Andersson | ............ | F24F 12/003 62/81 |
| 2016/0116191 A1 * | 4/2016 | Tamaki | ............ | F25B 13/00 62/160 |
| 2018/0195745 A1 * | 7/2018 | Rice | ............ | F24F 3/1423 |
| 2020/0224919 A1 * | 7/2020 | Clayton | ............ | F24F 12/003 |

* cited by examiner

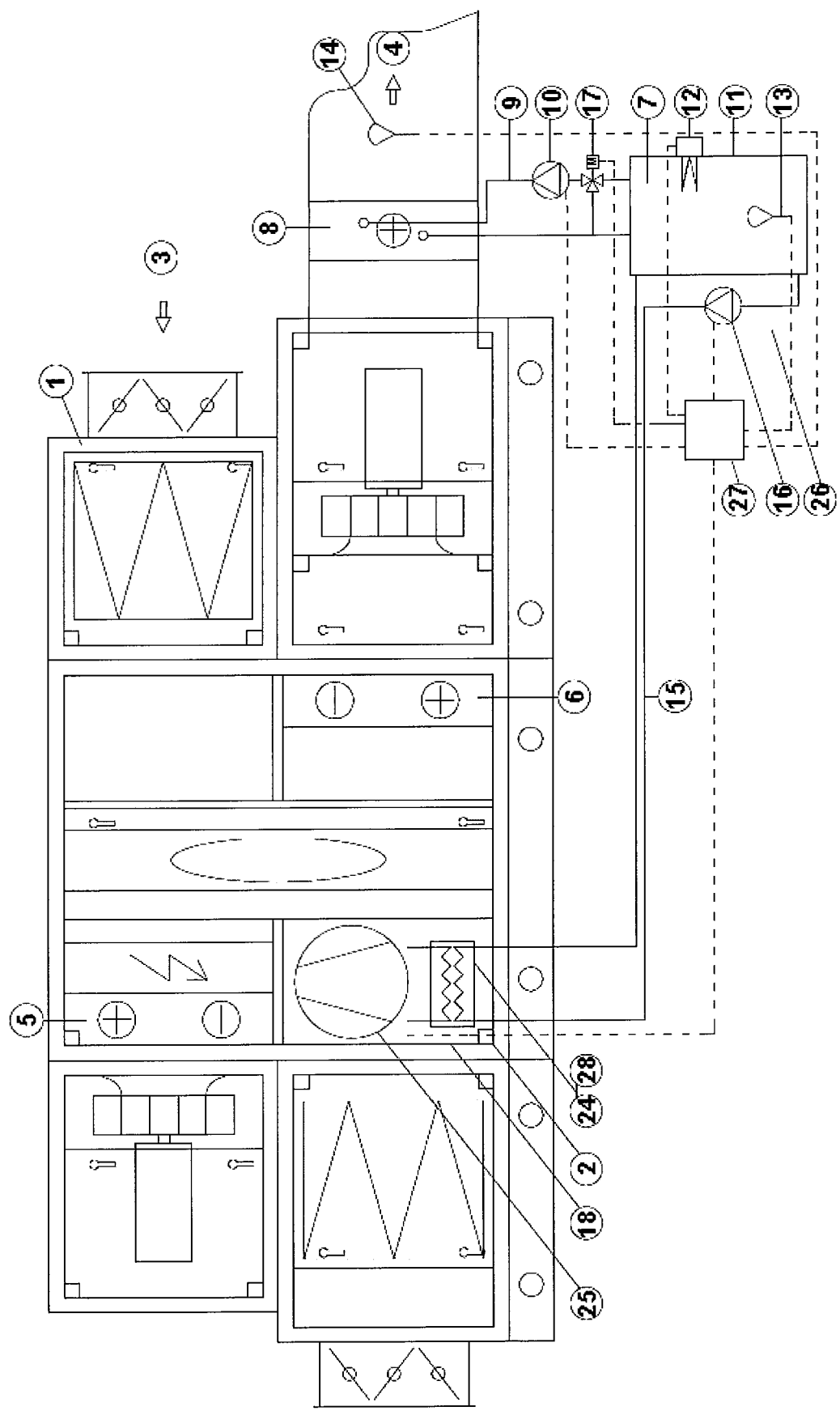

METHOD AND DEVICE FOR REDUCING OR ELIMINATING THE TEMPERATURE DROP OF THE SUPPLY AIR TEMPERATURE DURING DEFROSTING OF AN EVAPORATOR AT AN AIR HANDLING UNIT

PRIORITY APPLICATIONS

This application is a U. S. National Stage Filing under 35 U.S.C. 371 from International Application No. PCT/SE2017/050522, filed on 18 May 2017 and published as WO 2017/217904 on 21 Dec. 2017, which claims the benefit of priority to Swedish Patent Application No. 1650851-7 filed 16 Jun. 2016, which applications and publication are incorporated herein by referenced in their entirety.

TECHNICAL FIELD

The present invention is applicable to an air treatment device which comprises an air handling unit with heat recovery via a heat pump. The heat pump recovers heat from the extract air through a first so-called DX-coil (direct expansion coil), which in heating operation acts as a evaporator, and transfers this heat to the supply air through a second DX-coil, which in heating operation acts as a condenser. The invention relates to a method and device for reducing or completely eliminating the temperature decrease in the supply air stream while the first DX-coil (evaporator) is defrosted by so-called reversible operation, which means that the refrigerant in the heat pump refrigerant circuit is sent in the opposite direction, i.e. the heat is temporarily collected from the supply air and sent to the extract air to defrost the first DX-coil.

BACKGROUND OF THE INVENTION

In the air treatment field, it is well known to use a heat pump in combination with an air handling unit to recover heat from the extract air and transfer to the supply air. In some cases, only the heat pump is used as a recovery device and in other cases a conventional heat recovery device, such as a rotary heat exchanger, a cross-flow heat exchanger or the like, is combined with further recovery by means of a heat pump. The present invention works in both cases, with or without any other type of recovery device. When the supply air is heated by means of the heat energy from the extract air, problems arise with the evaporator, which is a so-called DX-coil located in the extract air, at high heat absorption, that is, high heating demand, problems caused by ice growth. Because the heat absorption is large to cope with heating the supply air at cold outside temperatures, the evaporator becomes very cold, and if the extract air comprises moisture this freezes to ice in the evaporator. For this reason, the evaporator must be defrosted on a regular basis, and this can be done in different ways. The invention addresses applications where so-called reversible operation is used to defrost the evaporator. Reversible operation means that while there is a heat demand, the flow direction of the refrigerant changes, so that instead, temporarily for as short time as possible, heat is taken out of the DX-coil located in the supply air stream (which is usually the condenser in the heating case). In other words, hot refrigerant is temporarily sent to the DX-coil in the extract air (which in the heating case served as an evaporator) instead of the DX-coil in the supply air, to thaw the extract air coil from the inside. This causes the problem that the supply air temperature temporarily drops quite much during defrost operation, which must be avoided or at least minimized. Known solutions to this problem are that in the supply air stream, electrical heating or water heating batteries are installed which ensure that the temperature is maintained alternatively does not fall that much. The disadvantage of installing electric heater is that the installed power often has to be high, which also entails high costs for installing a powerful electric heating battery, and also the need of a high power fuse, and high power output with expensive operation as a consequence. Installing a water heating battery entails high costs and requires that this can be connected to district heating or other heating system with shunt group etc., which makes the solution expensive as well as dependence on external heating systems for the purpose. There is thus a need for cheaper alternative solutions that can also operate "stand alone" to reduce or completely eliminate the supply air temperature drop during defrosting of the evaporator in reversible operation.

DISCLOSURE OF THE INVENTION

With the present invention, the object of solving the above problems is solved from the first aspect of the invention by the inventive method at an air handling unit according to the preamble of claim 1. By in various ways accumulate heat energy in an accumulator medium during non-defrosting operation, and then use the accumulated energy during the defrosting operation to heat up the supply air after the second DX-coil by heat exchange between the accumulator medium and supply air flow, the installation of high electrical power or expensive heating systems is avoided. The system equalizes or eliminates the temperature drop that otherwise occurs during defrosting with reversible operation of the first DX-coil in the extract air. Depending on which solution according to the embodiments below, the accumulator medium can be "charged" with heat of different temperatures, the higher the temperature of the accumulator medium is, the lesser temperature drop can be achieved. Of course, the heat exchange also depends on the possible solution of the heat transfer between the medium and the supply air. In some of the following embodiments, the temperature drop can be eliminated, while in other cases at least reduced, which may be sufficient depending on what can be allowed in the particular plant. According to the preferred embodiment, a heating coil is provided in the supply air stream after the second DX-coil, which heating coil is coupled to a first circulation circuit. Further, at least one second temperature sensor is provided in the supply air stream after the heating coil. In the circulation circuit, the accumulator medium can circulate by means of a circulation pump between an accumulator tank connected to the circulation circuit and the heating coil. According to the method of reducing or eliminating the temperature drop of the supply air, the control system assures that heat energy is accumulated in the accumulator medium contained in the circulation circuit and/or in the accumulator tank, during non-defrost operation. When the need for defrosting of the first DX-coil occurs, defrosting operation begins and in order not to decrease the supply air temperature too much, the accumulated heat energy is delivered to the supply air stream by circulating the accumulator medium in the circulation circuit. Thus, the heating coil is heated by the heat accumulated in the accumulator tank and the supply air stream is heated by heat exchange between the heating coil and the air. By having a buffer with heat that can be added during defrosting, no high electric power or previously known expensive and complicated solutions are required.

According to a further preferred embodiment, the first circulation circuit comprises a shunt valve which, together with the second temperature sensor, allows to control the amount of accumulator medium circulating through the heating coil alternatively controlling the temperature of the accumulator medium circulating through the heating coil. This by adding enough heated accumulator medium from the accumulator tank so that the supply air temperature after the heating coil is controlled to the desired value. Depending on how the accumulator medium is heated and how warm the accumulator medium is in the tank, it is advantageous to be able to control the amount or temperature of the medium. An uncomplicated and cost-effective way to control the supply air temperature during defrost operation has thus been achieved.

According to a preferred embodiment of the method of reducing or completely eliminating the reduction of supply air temperature during defrosting, the accumulator medium is heated by an electrical heater which is disposed in connection to the accumulator tank and which heats the accumulator medium in the tank to the desired temperature. Unlike installing an electrical heater directly in the supply air, the installed power can be kept low, as the power requirement taken out in the case of defrosting, so to speak, is accumulated in the tank. The accumulator medium is thus heated during non-defrosting, that is, for a long time, so the electrical power of the electrical heater can be low. The accumulator medium is heated until the desired temperature in the tank is reached and the accumulator medium can then be "kept warm" until defrosting is initiated and the need for heating of the supply air is indicated. This is an easy way to heat the accumulator medium.

In combination with the above alternatively as a separate solution, according to a preferred embodiment, the supply air stream is heated through the heating coil during non-defrosting, by controlling the heat pump to maintain the temperature in the supply air stream after the heating coil, based on the value of the second temperature sensor. In other words, in this case, the aforementioned circulation pump will circulate the accumulator medium in the circulation circuit so that the accumulator medium is heated by the supply air stream. By allowing the existing heat pump to work marginally "harder" during time for non-defrosting operation to simultaneously accumulate heat energy in the accumulator tank, no external heater is needed to accumulate heat. The temperature in the tank will then be the same as or very close to the supply air temperature, and once defrosting starts and the supply air temperature starts sinking, the circulation pump is again started to heat the supply air after the heating coil, by circulating the hot accumulator medium through the heating coil. This system can also be combined with having an installed electrical heater in the accumulator tank, such as an extra heater or the like. Thus, the heat pump's thermal energy can be used, even when the heat pump is reversibly driven, by the energy accumulated, which is not possible in known solutions.

In a further preferred embodiment, in combination with the above-described embodiments or alone, the accumulator medium is heated by utilizing the "waste heat" that is always encountered during compressor operation at a heat pump. By allowing a second circulation circuit to have a loop or a heat exchanger that utilizes and transmits waste heat from the outside of the compressor to the accumulator medium in the accumulator tank, the heat pump operation is further applied to charge heat during operation, which heat is then used during defrost of the first DX-coil, to heat the supply air.

The first circulation pump circulates the accumulator medium between the tank and the heating coil while the other circulation pump circulates the accumulator medium to take advantage of the heat from the outside of the compressor and charge the accumulator tank. Better overall economy and increased recovery are obtained in this way.

An alternative way of utilizing the heat pump's energy is that a so-called hot gas heat exchanger is arranged with its one side on the pressure side of the compressor in the refrigerant system and with its other side as part of the second circulation circuit. Through hot gas heat exchange with the refrigerant circuit, the accumulator medium is heated to the desired temperature, by the second circulation circuit, as said being coupled to the other side of the heat exchanger, to transmit the compressor's hot gas heat of relatively high temperature to the accumulator medium in the tank. In the same manner as described above, the second circulation circuit must comprise a second circulation pump for circulation of the accumulator medium between the hot gas heat exchanger and the accumulator tank. The temperature can thus be higher, whereby the accumulator tank can be made smaller if desired. The system must also have the above-described shunt valve in order to control the temperature or amount of accumulator medium flowing through the heating coil for heating the supply air.

Yet another way to utilize waste heat from the system for heating the accumulator medium in the accumulator tank is the preferred method of heating with waste heat from the heat pump control cabinet. This is usually, but not always, integrated into the heat pump unit in the air handling unit, and by allowing a second circulation circuit to have a loop or heat exchanger that utilizes the heat in the control cabinet and transfer it to the accumulator tank, this energy can be utilized and used during defrosting to heat the supply air. In the same manner as above, the second circulation circuit comprises a circulation pump for circulating the accumulator medium between the control cabinet loop and the accumulator tank.

From a second aspect of the invention the object is achieved by that an air treatment device of the initially specified kind comprises an air handling unit and an accumulator device, said accumulator device comprising an accumulator medium which is at least partially arranged in contact with the supply air stream after the second DX-coil. By heat exchange between the supply air stream and the accumulator medium, the accumulator device can, during non-defrosting, accumulate heat energy, which energy is then used during defrosting by reversible operation of the first DX-coil for heating the supply air after the second DX-coil. This reduces or eliminates the unwanted temperature reduction of the supply air during defrosting in a much simpler and more cost-effective way compared with existing solutions. According to the preferred embodiment of the device, the accumulator device comprises a heating coil which is arranged in the supply air stream after the second DX-coil. The heating coil is coupled to a first circulation circuit comprising the accumulator medium, a first circulation pump for circulating the accumulator medium in the first circulation circuit and an accumulator tank for storing the accumulator medium. The accumulator tank, in turn, comprises at least one first temperature sensor for sensing the temperature of the accumulator medium in the tank. In the supply air stream after the heating coil, at least one second temperature sensor is provided for recording the temperature in the supply air stream after the heating coil. The accumulator device further comprises control equipment which is arranged to ensure that the accumulator medium is heated to the desired temperature and accumulated in the accumulator tank during non-defrost operation. The control equipment is further arranged to ensure that the accumulated heat energy is delivered to the supply air stream during defrost operation, by circulating the accumulator medium by means of the circulation pump in the first circulation circuit, whereby the heat is delivered by heat exchange between the accumulator medium in the heating coil and the supply air passing the heating coil. This reduces or eliminates the temperature drop of the supply air during defrosting. Because the device has a heat buffer that may be added during defrosting, no high electrical power or prior-art expensive and complicated solutions are required.

According to a further preferred embodiment of the device, the first circulation circuit also comprises a shunt valve which, together with the second temperature sensor, is arranged to control the amount of accumulator medium to circulate through the heating coil. Alternatively, the device is arranged to control the temperature of the accumulator medium circulating through the heating coil. By controlling the mixture of controlled amount of heated accumulator medium from the accumulator tank, the supply air temperature after the heating coil can be controlled to the desired value. The shunt valve and the second temperature sensor can be used by the control equipment to control the amount of or the temperature of the accumulator medium depending on how the accumulator medium is heated and how warm the accumulator medium is in the tank. An uncomplicated and cost-effective device for controlling the supply air temperature during defrost operation has thus been obtained.

According to a preferred embodiment, the device comprises an electrical heater which is arranged in connection to the accumulator tank for heating the accumulator medium in the tank to the desired temperature. By heating the accumulator medium instead of the supply air directly, the installed electrical power can be kept low, as the power requirement needed in connection with defrosting, so to speak, is accumulated in the tank. Through the control system, the electrical heater is used primarily during non-defrosting time, that is, for a long time, so the electrical power of the electrical heater can be low. The electrical heater is arranged to heat the accumulator medium until the desired temperature in the tank is reached and then maintain the heat in the medium until defrosting is initiated, and the need for heating of the supply air is indicated. This is an easy way to heat the accumulator medium.

According to a further preferred embodiment of the device, the control equipment is arranged to control the heat pump to maintain the temperature in the supply air stream after the heating coil, based on the value of the second temperature sensor. The control equipment is further adapted to control the operation of the circulation pump such that the circulation pump is operating during defrost operation and during non-defrost operation until the accumulator's temperature in the accumulator tank is close to the temperature in the supply air stream after the heating coil.

In a preferred embodiment, the accumulator device comprises a second circulation circuit which comprises a loop or heat exchanger in connection to the exterior of the compressor, for heat recovery of waste heat from the compressor. Further, the second circulation circuit comprises a circulation pump for circulating the accumulator medium in the second circuit and the second circulation circuit is further connected to the accumulator tank. Through the second circulation circuit it is possible to alone or in combination with other embodiments "charge" the accumulator medium with heat by transferring waste heat from the compressor to the accumulator medium in the accumulator tank. Known solutions do not take advantage of the waste heat energy from the outside of the compressor and use it to reduce the temperature drop that otherwise occurs in the supply air during defrosting by reversible operation.

An alternative embodiment to the above is to use the hot gas heat from the heat pump circuit to further utilize more energy from the compressor operation. This by that the device comprises a hot gas heat exchanger which is arranged with its one side on the pressure side of the compressor in the refrigerant system, and the other side of the heat exchanger is arranged as part of the second circulation circuit. As above, the second circulation circuit comprises a second circulation pump for circulating the accumulator medium in the second circulation circuit, and the second circulation circuit is also connected to the accumulator tank. This embodiment is compatible with other means of heating the accumulator medium and could be combined with other heat recovery loops, for example with heat recovery of waste heat from the outside of the compressor.

Yet another option is to, instead or also, use the waste heat available in the control cabinet that is often arranged in connection with the heat pump. Like when waste heat is taken from the outside of the compressor, this alternative comprises a loop or heat exchanger but inside the control cabinet, whereby heat is absorbed and transferred to the accumulator medium by the second circulation circuit including a second circulation pump for circulating the accumulator medium in the second circulation circuit, and the second circulation circuit is also connected to the accumulator tank.

Through the invention, a number of advantages over known solutions have been obtained:
 Accumulation of heat energy during operation when no defrosting is in progress and use of this heat energy during defrosting to eliminate or decrease the temperature drop during defrost operation with reversible operation.
 Low-value heat energy can be used, resulting in low operating costs.
 Waste heat from the heat pump and/or control cabinet can be used in different ways, a type of heat that is otherwise completely unused.
 Lower installed power output even if electrical heater is used because accumulation is used.
 Can be used stand alone, i.e. need not a connection to the heating system of the building.

BRIEF DESCRIPTION OF THE DRAWINGS

The following schematic figure showing:
FIG. 1 shows a principle view of an air handling unit provided with a heat pump and an accumulator device according to the invention, which accumulator comprises a number of preferred alternative embodiments, where a certain control is required to collect and discharge heat energy from/to a supply air, respectively, to reduce or eliminate temperature drop during defrost operation.

The constructive design of the present invention is set forth in the following detailed description of embodiments of the invention with reference to the accompanying figures, which show preferred, but not limiting, embodiments of the invention.

DETAILED DESCRIPTION OF THE DRAWINGS

FIG. 1 shows an air handling unit 1, which comprises a heat pump 2 arranged to recover heat from an extract air stream 3, and transfer this heat to a supply air stream 4. Therefore, the heat pump 2 comprise a first DX-coil 5 in the extract air stream 3, which coil in the heating case acts as an evaporator in the heat pump process, and further the heat pump 2 comprises a second DX-coil 6 in the supply air stream 4, which in the heating case acts as a condenser. The heat pump process is well known and in this case the refrigerant system of the heat pump 2 comprises a four-way valve (not shown) which is arranged for so-called reversible operation. Reversible operation of the heat pump 2 means that a refrigerant included in the refrigerant system is sent directly to the first DX-coil 5 (evaporator) instead of the other DX-coil 6 (condenser) to defrost the first DX-coil 5 (evaporator). By reversing the system for a short period of time, instead, the heat is taken from the supply air stream 4, whereby the heated refrigerant is sent to the first DX-coil 5, and the coil is thereby defrosted. The disadvantage is that the temperature after the second DX-coil 6 then drops. In order to solve this problem, an accumulator medium 7, preferably in the form of freeze-protected water, is arranged in a first circulation circuit 9. Said first circulation circuit 9 comprises, in part, the accumulator medium 7, a first circulation pump 10 for circulating the medium in the circuit between a heating coil 8 arranged in the supply air stream 4 and an accumulator tank 11. The heating coil 8 is arranged after the second DX-coil 6, either as in the figure in a duct part after the air handling unit 1, alternatively as an integral part of the air handling unit 1. Optionally, the first circulation circuit 9 comprises a shunt valve 17 for controlling the amount of accumulator medium 7 in the heating coil 8, alternatively the temperature thereof, via a control device 27. The accumulator tank 11 also includes in the preferred example a first temperature sensor 13. Further, one embodiment is illustrated by the fact that the accumulator tank 11 may comprise an electrical heater 12 for heating the accumulator medium 7 in the accumulator tank 11. Further, it is preferable that a second temperature sensor 14 is arranged in the supply air stream 4 after the second DX-coil 6 for recording the supply air temperature and for the possible control based on the desired supply air temperature.

In combination with the electrical heater 12, or as stand-alone solutions, preferred examples are shown that the accumulator medium 7 may be heated in other ways. An alternative is that the control device 27 controls the heat pump 2 to maintain the supply air temperature, on the basis of the supply air temperature registered by the second temperature sensor 14, while the first circulation pump 10 circulates the accumulator medium 7 through the heating coil 8 to heat it during non-defrost operation and stores the heated accumulator medium 7 in the accumulator tank 11. This keeps the temperature in the tank at about the same temperature as the desired supply air temperature. During defrosting, the accumulator medium 7 is again circulated by means of the first circulation pump 10, whereby the supply air is heated by heat exchange with the loop of the heating coil 8.

Another alternative is that a second circulation circuit 15 by means of a second circulation pump 16 also circulates the accumulator medium 7 between the accumulator tank 11 and heat absorption loop/heat exchanger 28 which is arranged around/on the outside of the compressor 2 to utilize the waste heat always provided by the compressor operation. The second circulation pump 16 may optionally, via the control equipment 27, be controlled to continuously or when desired, take advantage of this waste heat to "load" the accumulator medium 7 with heat for storage in the accumulator tank 11 prior to the next defrost period. In the figure, the loop 28 in connection to the compressor 2 also symbolizes the option which alone or in combination with the waste heat recovery from the outside of the compressor 2, can take advantage of the heat generated in the heat pump control cabinet 18 (not directly visible in figure). The control cabinet 18 is often integrated into the heat pump unit inside an air handling unit 1, but may also be stand alone. The invention takes advantage of the option to also use this waste heat, which otherwise will not benefit from the defrosting process. The same loop may also further symbolize an option of recovering hot gas heat from the heat pump process itself. As previously mentioned, the refrigerant system is not described in detail or by drawing but a hot gas heat exchanger 24 is provided with its one side on the pressure side of the compressor 2 in the refrigerant system and its other side is provided as a part of the second circulation circuit 15. By utilizing the hot gas heat from the heat pump process and transfer it to the accumulator tank 11 via the second circulation circuit 15 and the second circulation pump 16, the heat pump is maximally used to charge heat for future defrosting. All of the above-described alternatives can be used alone or supplemented with one or more of the other options to best reduce or eliminate the temperature drop during defrosting of the first DX-coil 5.

PARTS LIST

1=air handling unit
2=heat pump
3=extract air stream
4=supply air stream
5=first DX-coil
6=second DX-coil
7=accumulator medium
8=heating coil
9=first circulation circuit
10=first circulation pump
11=accumulator tank
12=electrical heater
13=first temperature sensor
14=second temperature sensor
15=second circulation circuit
16=second circulation pump
17=shunt valve
18=control cabinet
24=hot gas heat exchanger
25=compressor
26=accumulator device
27=control equipment
28=loop/heat exchanger

The invention claimed is:
1. Method for reducing or eliminating a temperature drop of supply air temperature during a defrost operation at an air handling unit (1) arranged with a heat pump (2), wherein the heat pump (2) in a heating mode recovers heat energy from an extract air stream (3) and transfers it to a supply air stream (4), the heat pump (2) comprises a refrigerant system with a compressor (25), a four-way valve, and a first DX-coil (5) arranged in the extract air stream (3), and a second DX-coil (6) arranged in the supply air stream (4), the heat pump (2) is arranged for a reversible operation for defrosting the first DX-coil (5), whereby the heat energy is instead recovered from the supply air stream (4) and transferred to the extract air stream (3) by shifting the direction of flow of a refrigerant in the refrigerant system by the four-way valve, whereby heated refrigerant is sent to the first DX-coil (5) instead of to the second DX-coil (6), wherein during a non-defrosting operation, heat energy (E) is accumulated in a designated accumulator medium (7), which is at least partly arranged in contact with the supply air stream (4) after the second DX-coil (6), and that during the defrost operation of the first DX-coil (5), the accumulated heat energy (E) is delivered to the supply air stream (4) after the second DX-coil (6) by heat exchange between the accumulator medium (7) and the supply air stream (4), and that a heating coil (8) is arranged in the supply air stream (4) after the second DX-coil (6), and that the heating coil (8) is connected to a first circulation circuit (9), wherein the first circulation circuit (9) comprises the accumulator medium (7), a first circulation pump (10) for circulating the accumulator medium (7) in the first circulation circuit (9) and an accumulator tank (11) for storing the accumulator medium (7), wherein the accumulator tank (11) comprises at least one first temperature sensor (13), and at least one second temperature sensor (14) is arranged in the supply air stream (4) after the heating coil (8), and during the non-defrosting operation, the accumulator medium (7) is heated to a desired temperature and accumulated in the accumulator tank (11), and the accumulated heat energy (E) is delivered to the supply air stream (4) during the defrost operation, by the accumulator medium (7) that is circulated in the first circulation circuit (9), whereby the supply air stream (4) is heated by the heating coil (8), and wherein the accumulator medium (7) is heated by the supply air stream (4) via the heating coil (8) during the non-defrosting operation, by controlling the heat pump (2) to maintain the temperature in the supply air stream (4) after the heating coil (8) based on the value of the second temperature sensor (14).

2. Method according to claim 1, wherein the first circulation circuit (9) comprises a shunt valve (17) for controlling the amount of accumulator medium (7) circulating through the heating coil (8), or controlling the temperature of the accumulator medium (7) circulating through the heating coil (8), whereby the temperature of the supply air (4) after the heating coil (8) is controlled to the desired value.

3. Method according to claim 1, wherein the accumulator medium (7) is heated by an electrical heater (12) that is arranged in the accumulator tank (11), which heats the accumulator medium (7) to the desired temperature.

4. Method according to claim 1, wherein circulation pump (10) is controlled to operate during the defrost operation and during the non-defrosting operation until the temperature of the accumulator medium (7) in the accumulator tank (11) reaches the temperature in the supply air stream (4) after the heating coil (8).

5. Method according to claim 1, wherein the accumulator medium (7) is heated by waste heat from the operation of the compressor (25) by a second circulation circuit (15) that is transferring the waste heat from the compressor (25) to the accumulator medium (7) in the accumulator tank (11), wherein the second circulation circuit (15) comprises a loop/heat exchanger (28) in connection to the outside of the compressor (25) and a second circulation pump (16), which is circulating the accumulator medium (7) in the second circulation circuit (15) between the outside of the compressor (25) and the accumulator tank (11).

6. Method according to claim 1, wherein the accumulator medium (7) is heated by hot gas heat exchange to the desired temperature, by transferring the hot gas heat from the compressor (25) to the accumulator medium (7) in the accumulator tank (11) by a second circulation circuit (15), wherein a hot gas heat exchanger (24) is arranged with one side on the high pressure side of the compressor (25) in the refrigerant system, and an other side is arranged as part of the second circulation circuit (15), and the second circulation circuit (15) further comprises a second circulation pump (16) for circulating the accumulator medium (7) in the second circulation circuit (15), between the hot gas heat exchanger (24) and the accumulator tank (11).

7. Method according to claim 1, wherein the accumulator medium (7) is heated by waste heat from a control cabinet (18) of the heat pump (2), wherein a second circulation circuit (15) transfers the waste heat from the control cabinet (18) to the accumulator medium (7) in the accumulator tank (11), wherein the second circulation circuit (15) comprises a loop/heat exchanger (28) inside the control cabinet (18) and a second circulation pump (16) which is circulating the accumulator medium (7) in the second circulation circuit (15) between the control cabinet (18) and the accumulator tank (11).

8. Air treatment device comprising an air handling unit (1) and an accumulator device (26), wherein the accumulator device (26) is arranged to reduce or eliminate a temperature drop of a supply air temperature during a defrost operation at the air handling unit (1), wherein the air handling unit (1) is arranged with a heat pump (2), wherein the heat pump (2) is arranged to recover heat energy from an extract air stream (3) and transfer it to a supply air stream (4), the heat pump (2) comprising a refrigerant system with a compressor (25), a four-way valve, a first DX-coil (5) arranged in the extract air stream (3) and a second DX-coil (6) arranged in the supply air stream (4), wherein the heat pump (2) is further arranged for a reversible operation for defrosting the first DX-coil (5), whereby the heat energy is recovered from the supply air stream (4) and transferred to the extract air stream (3) by shifting the direction of flow of a refrigerant in the refrigerant system by the four-way valve, whereby heated refrigerant is sent to the first DX-coil (5) instead of to the second DX-coil (6), wherein the accumulator device (26) comprises an accumulator medium (7), which is at least partly arranged in contact with the supply air stream (4) after the second DX-coil (6), and the accumulator device (26) is further arranged to, during a non-defrosting operation, accumulate heat energy (E) in the accumulator medium (7), and further arranged to, during the defrost operation of the first DX-coil (5) deliver said accumulated heat energy (E) in the supply air stream (4) after the second DX-coil (6), by heat exchange between the accumulator medium (7) and the supply air stream (4), wherein a heating coil (8) is arranged in the supply air stream (4) after the second DX-coil (6), wherein the heating coil (8) is connected to a first circulation circuit (9), wherein the first circulation circuit (9) comprises the accumulator medium (7), a first circulation pump (10) for circulating the accumulator medium (7) in the first circulation circuit (9) and an accumulator tank (11) for storage of the accumulator medium (7), and wherein the accumulator tank (11) comprises at least one first temperature sensor (13), and at least one second temperature sensor (14) is arranged in the supply air stream (4) after the heating coil (8), and wherein the accumulator device (26) comprises control equipment (27) which is arranged to ensure that the accumulator medium (7) is heated to a desired temperature, and wherein the accumulator medium (7) is arranged to be accumulated in the accumulator tank (11) during a non-defrosting operation, and the control equipment (27) is further arranged to ensure that the accumulated heat energy (E) is delivered to the supply air stream (4) during the defrost operation, wherein the accumulator medium (7) is circulated in the first circulation circuit (9), and wherein the control equipment (27) is arranged to control the heat pump (2) to maintain the temperature in the supply air stream (4) after the heating coil (8) based on the value of the second temperature sensor (14).

9. Air treatment device according to claim 8, wherein the first circulation circuit (9) comprises a shunt valve (17), arranged to control the amount of accumulator medium (7) circulating through the heating coil (8), or the temperature of the accumulator medium (7) circulating through the heating coil (8) being controlled.

10. Air treatment device according to claim 8, wherein an electrical heater (12) is arranged in the accumulator tank (11), which is arranged to heat the accumulator medium (7) to a desired temperature.

11. Air treatment device according to claim 8, wherein the control equipment (27) is further arranged to control the operation of the circulation pump (10) so that the circulation pump (10) is operating during the defrosting operation and during the non-defrosting operation until the temperature of the accumulator medium (7) in the accumulator tank (11) reaches the temperature in the supply air stream (4) after the heating coil (8).

12. Air treatment device according to claim 8, wherein a second circulation circuit (15) is arranged to transfer waste heat from the compressor (25) to the accumulator medium (7) in the accumulator tank (11), wherein the second circulation circuit (15) comprises a loop/heat exchanger (28) in connection with the outside of the compressor (25), a second circulation pump (16) for circulating the accumulator medium (7) in the second circulation circuit (15), and wherein the second circulation circuit (15) is connected to the accumulator tank (11).

13. Air treatment device according to claim 8, wherein a second circulation circuit (15) is arranged to transfer hot gas heat from the compressor (25) to the accumulator medium (7) in the accumulator tank (11), wherein the second circulation circuit (15) comprises a hot gas heat exchanger (24) arranged with one side on the high pressure side of the compressor (25) in the refrigerant system, and another side arranged as a part of the second circulation circuit (15), and wherein the second circulation circuit (15) further comprises a second circulation pump (16) for circulating the accumulator medium (7) in the second circulation circuit (15), and wherein the second circulation circuit (15) is connected to the accumulator tank (11).

14. Air treatment device according to claim 8, wherein a second circulation circuit (15) is arranged to transfer waste heat from a control cabinet (18) of the heat pump (2), wherein the second circulation circuit (15) comprises a loop/heat exchanger (28) inside the control cabinet (18), a second circulation pump (16) for circulating the accumulator medium (7) in the second circulation circuit (15), and wherein the second circulation circuit (15) is connected to the accumulator tank (11).

\* \* \* \* \*